United States Patent [19]

Hanai et al.

[11] Patent Number: 5,198,110

[45] Date of Patent: Mar. 30, 1993

[54] BUNDLE OF PERMSELECTIVE HOLLOW FIBERS AND A FLUID SEPARATOR CONTAINING THE SAME

[75] Inventors: Tomoji Hanai, Nobeoka; Yoshiaki Nitadori, Fuji; Joji Nishikido; Tetsuo Watanabe, both of Nobeoka, all of Japan

[73] Assignee: Asahi Medical Co., Ltd., Tokyo, Japan

[21] Appl. No.: 718,975

[22] Filed: Jun. 21, 1991

[30] Foreign Application Priority Data

Jul. 2, 1990 [JP] Japan .................... 2-172692

[51] Int. Cl.$^5$ .................... B01D 63/00; B01D 39/00
[52] U.S. Cl. .................... 210/321.79; 210/321.78; 210/321.8; 210/321.88; 210/321.89; 210/500.23
[58] Field of Search .................... 210/500.23, 321.78, 210/321.8, 321.74, 321.89, 321.83, 321.87, 321.79, 321.88; 138/130

[56] References Cited

U.S. PATENT DOCUMENTS

| | | | |
|---|---|---|---|
| 4,066,553 | 1/1978 | Bardonnet et al. | 210/321.87 |
| 4,293,418 | 10/1981 | Fujii et al. | 210/321.81 |
| 4,428,403 | 1/1984 | Lee et al. | 138/130 |
| 4,911,846 | 3/1990 | Akasu et al. | 210/500.23 |
| 4,950,391 | 8/1990 | Weickhardt | 210/321.8 |

FOREIGN PATENT DOCUMENTS

| | | |
|---|---|---|
| 0329980 | 8/1989 | European Pat. Off. |
| 15381 | 4/1988 | Japan ................ 210/500.23 |

OTHER PUBLICATIONS

Patent Abstracts of Japan, vol. 14, No. 236 (C-720) (4179), 1990.
European Search Report.

*Primary Examiner*—Robert A. Dawson
*Assistant Examiner*—Ana M. Fortuna
*Attorney, Agent, or Firm*—Birch, Stewart, Kolasch & Birch

[57] ABSTRACT

A bundle of permselective hollow fibers is disclosed, containing a plurality of filaments having a fineness of from 0.05 to 20 denier at a filament-to-hollow fiber ratio of from 2 to 3000. The filaments intermingle with the hollow fibers substantially lengthwise over the length of the hollow fibers, and substantially all of the filaments each engage with at least one of the hollow fibers, thereby placing the hollow fibers into an inseparable bundle. The bundle has not only a high packing ratio of hollow fibers, but also an effective arrangement for efficiently exerting a high performance of each hollow fiber. The bundle can be constructed into a fluid separator, which is useful for dialysis, ultrafiltration, osmosis, reverse osmosis, pressure separation of gas mixtures and the like.

8 Claims, 3 Drawing Sheets

BUNDLE OF PERMSELECTIVE HOLLOW FIBERS AND A FLUID SEPARATOR CONTAINING THE SAME

BACKGROUND OF THE INVENTION

1. Field of the Invention

The present invention relates to a bundle of permselective hollow fibers and a fluid separator containing the same. More particularly, the present invention is concerned with a bundle comprising a plurality of porous hollow fibers extending substantially in parallel and a plurality of filaments which intermingle with the hollow fibers substantially lengthwise over the length of the hollow fibers, and wherein substantially all of the filaments each engage with at least one of the hollow fibers, thereby placing the hollow fibers into an inseparable bundle. Further, the present invention is concerned with a fluid separator containing the bundle for use in the separation of a component or components from a liquid or a mixed gas, for example, for use in dialysis, ultrafiltration, osmosis, reverse osmosis, pressure separation of gas mixtures and the like.

The bundle of the present invention has not only a high packing ratio of hollow fibers, but also an effective arrangement for ensuring narrow but uniform spacings between hollow fibers and hence for efficiently exerting a high performance of each hollow fiber.

2. Discussion of Related Art

With respect to the fluid separator comprising hollow fibers, the demand for an apparatus having a small fineness but exhibiting a high performance is very strong in the art. To meet the strong demand, various proposals have been made.

U.S. Pat. No. 4,293,418 discloses a fluid separator comprising a bundle of a plurality of hollow fiber elements. Each of the hollow fiber elements consists of one or two permselective hollow fibers and a spacer yarn composed of a textured yarn. The spacer yarn is spirally wound around one or two hollow fibers, and the apparent thickness of the spacer yarn is 0.5 to 3 times the outer diameter of the hollow fiber, which outer diameter is 50 to 600 microns. The windings are regular, and the number of windings of the spacer yarn around each hollow fiber is 0.5 to 20 per 10 mm length of the hollow fiber. The hollow fiber packing ratio in the separator is 30 to 78%. When it is intended to obtain a hollow fiber packing ratio as high as 60% or above, the bundle of hollow fibers must be squeezed so as to have a decreased diameter prior to the incorporation into a tubular casing of a fluid separator. This squeezing is likely to be accompanied by a break of hollow fibers and hence by a poor assembly yield. The use of a spacer yarn having a small diameter which is selected in order to obtain a high hollow fiber packing ratio, causes the winding of the spacer yarn around the hollow fiber to be extremely difficult, and hence causes the mass production of the hollow fiber bundle to be infeasible. Moreover, since the spirally wound spacer yarn provides a spacing between the hollow fibers only at intervals and not continuously over the lengths of the hollow fibers, the function of the spacer yarn as a spacer is not satisfactory when the diameter of the spacer yarn is small. This causes poor separation efficiency. Therefore, according to the proposal of U.S. Pat. No. 4,293,418, it is difficult to attain both a high hollow fiber packing ratio and a high separation efficiency.

Japanese Patent Application laid-Open Specification No. 2-60658/1990 discloses a bundle of hollow fibers, a part of which are replaced by thick threads having no separating activity. From the proposal of the above-mentioned patent application as well, a bundle having both a high hollow fiber packing ratio and a high separation efficiency cannot be expected. Further, the employed thread has various modifications. For example, it may be longitudinally waved, or its diameter may be longitudinally changed. Further, it may be spirally wound. Still further, its surface may be uneven. The manufacturing of such a thread is difficult and costly.

U.S. Pat. No. 4,950,391 discloses a hollow fiber dialyzer comprising (1) a housing, (2) embedding compositions in the housing defining a dialyzing chamber between the compositions and defining blood inflow and outflow chambers outside the compositions between the compositions and the housing, (3) hollow fibers that are fastened at both ends and sealed to the embedding compositions so that the interiors of the fibers communicate with the inflow and outflow chambers, and that the exteriors of the fibers are exposed in the dialyzing chamber, and (4) spacing threads that are fastened at both ends in the embedding compositions, that are parallel to each other and the fibers, that are uniformly distributed in the dialyzing chamber and that are independent of the individual hollow fibers. The number of threads relative to the number of hollow fibers can be varied and modified to produce dialyzers of different capacity grades in spite of the use of one and the same housing. The threads serve to fill up dead (or unnecessary) spacings in the dialyzate chamber. The thread has approximately the same diameter or a diameter somewhat smaller than that of the hollow fiber. Depending on the capacity grade, one thread may be provided for about 10 to 25 hollow fibers, although the ratio of threads to hollow fibers may be varied. By the proposal of U.S. Pat. No. 4,950,391, a fluid separator having a small fineness but exhibiting a high separation efficiency cannot be obtained.

SUMMARY OF THE INVENTION

The present inventors have made extensive and intensive studies with a view toward developing a bundle having not only a high packing ratio of hollow fibers, but also an effective arrangement for ensuring narrow but uniform spacings between hollow fibers and hence for efficiently exerting a high performance of each hollow fiber. As a result, the present inventors have unexpectedly found that such a desired bundle of hollow fibers can be obtained by a novel, specific arrangement of hollow fibers and filaments, in which filaments having a fineness as small as 0.05 to 20 denier, in place of a yarn containing multiple filaments, randomly intermingle with the hollow fibers, in place of a regular spiral winding around one or two hollow fibers, substantially lengthwise over the length of the hollow fibers, and in which substantially all of the filaments each engage or tangle with at least one of the hollow fibers, thereby placing the hollow fibers into an inseparable bundle. Further, the present inventors have found that the expansion of the hollow fibers when they become wet is not hindered by virtue of the novel, specific arrangement of hollow fibers and filaments. The present invention is based on these novel findings.

Accordingly, it is an object of the present invention to provide a bundle of permselective hollow fibers having a high packing ratio of hollow fibers therein and having a structure such that when it is incorporated in a fluid separator casing and used for fluid separation, the outer surface of the hollow fibers of the bundle can be effectively used for fluid separation.

It is another object of the present invention to provide a fluid separator containing a bundle of permselective hollow fibers, which separator has a small fineness but exhibits an excellent separation efficiency.

The foregoing and other objects, features and advantages of the present invention will be apparent from the following detailed description and appended claims taken in connection with the accompanying drawings.

DETAILED DESCRIPTION OF THE INVENTION

In one aspect of the present invention, there is provided a bundle of permselective hollow fibers comprising:

a plurality of porous hollow fibers extending substantially in-parallel; and a plurality of filaments which intermingle with the hollow fibers substantially lengthwise over the length of the hollow fibers, each filament having a fineness of from 0.05 to 20 denier;

the ratio of the number of the filaments to the hollow fibers being from 2 to 3000;

substantially all of the filaments each engaging with at least one of the hollow fibers, thereby placing the hollow fibers extending substantially in-parallel into an inseparable bundle by means of the filaments while leaving spacings between the hollow fibers.

Figure 1:
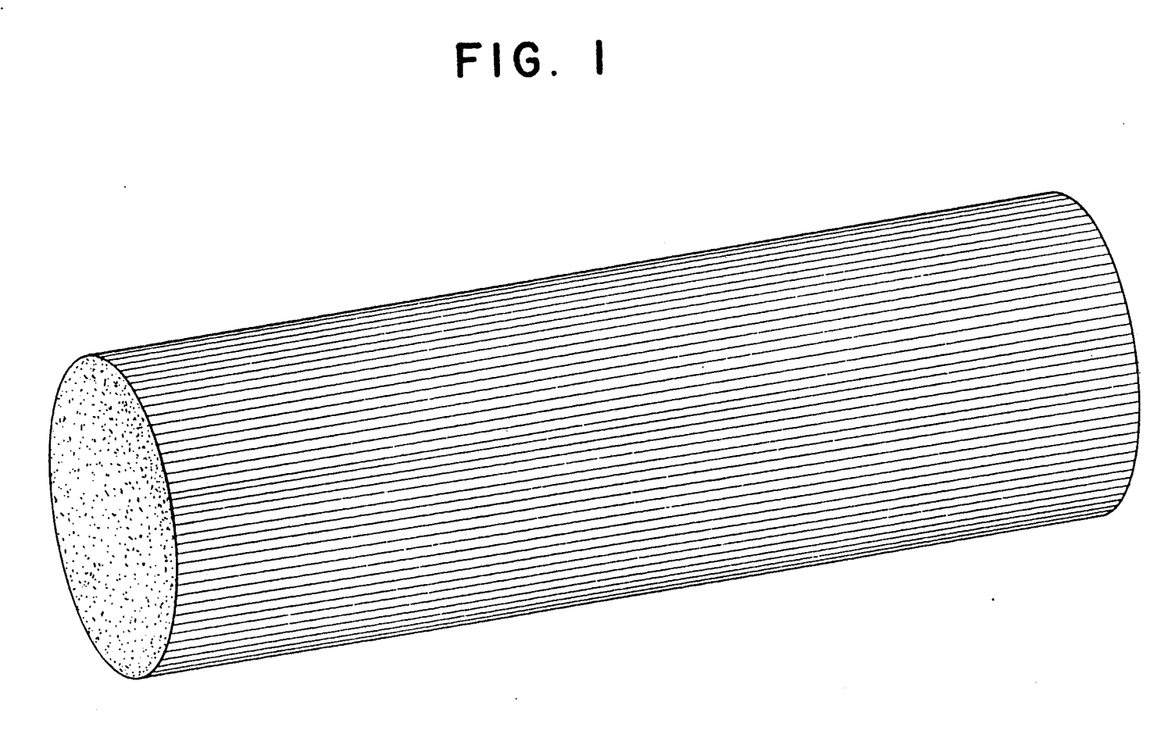
FIG. 1 shows a diagrammatic, perspective view of one form of the bundle of permselective hollow fibers of the present invention.

A diagrammatic, perspective view of one form of the bundle of permselective hollow fibers of the present invention is shown in FIG. 1. In FIG. 1, the longitudinally extending lines represent hollow fibers. In FIG. 1, the filaments are omitted, because the filaments are very fine as compared to the hollow fibers and cannot be easily recognized.

Figure 2:
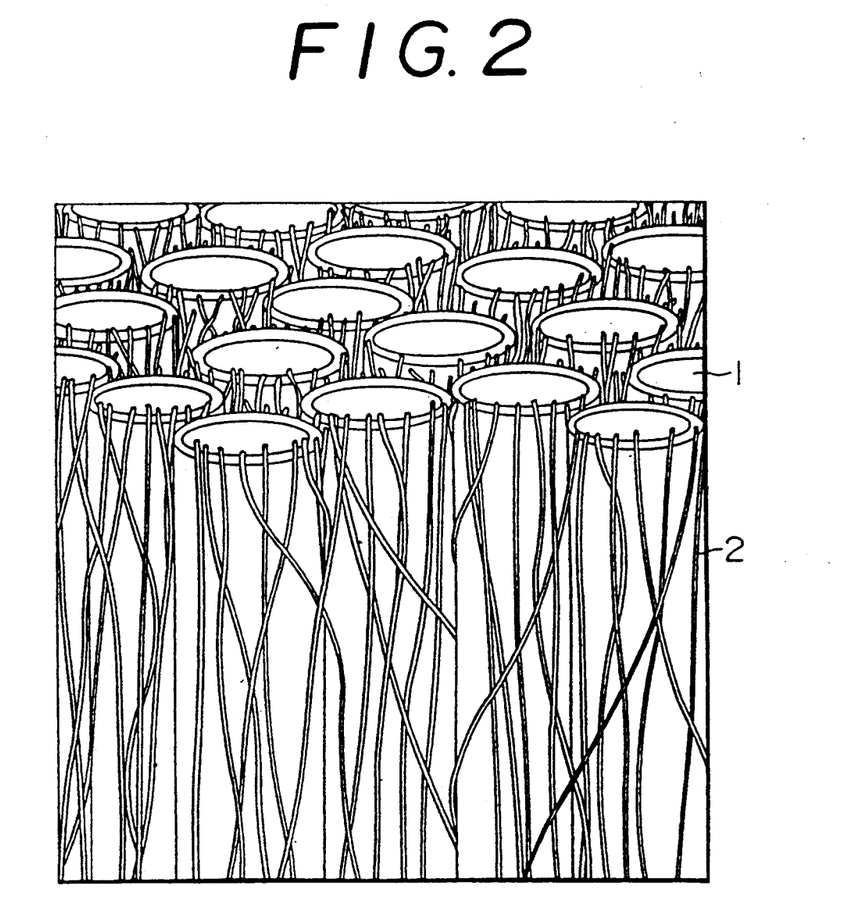
FIG. 2 shows a diagrammatic, magnified illustration of photomicrograph (partial perspective view) of one form of the bundle of permselective hollow fibers of the present invention which is cut in a direction perpendicular to the axis of the bundle.

FIG. 2 shows a diagrammatic, magnified illustration of the photomicrograph (partial perspective view) of one form of the bundle of permselective hollow fibers of the present invention which is cut in a direction perpendicular to the axis of the bundle. The illustration shows a typical arrangement of hollow fibers 1 and filaments 2 in the bundle of the present invention. In FIG. 2, top ends of cut filaments 2 appear to project above the plane of the cross-sections of the hollow fibers. This projection is due to a difference of elasticity between hollow fiber 1 and filament 2. Filaments 2 easily elongate during cutting.

The material, pore structure, cross-section morphology, cross-section diameter, wall thickness and the like of the hollow fiber to be used in the bundle of the present invention are not critical as long as appropriate permselectivity is ensured. A wide variety of hollow fibers can be used in the present invention, for which reference is made to U.S. Pat. Nos. 3,888,771, 3,930,105, 4,056,467 and 4,221,903, Japanese Patent Application Laid-Open Specification Nos. 61-20560 and 50-128773, European Patent Application Publication No. 341,309 and U.K. Patent No. 2,001,899.

Representative examples of hollow fiber materials include polyolefins, such as polypropylene; polystyrene; polyacrylonitrile; polymethyl methacrylate; polyamides; polyesters; celluloses, such as cuprammonium regenerated cellulose; and cellulose derivatives, such as cellulose acetate.

In the bundle of permselective hollow fibers of the present invention, it is preferred that each hollow fiber have an annular cross-section having an outer diameter of from 100 to 1000 $\mu$m.

In the bundle of the present invention, substantially all of the filaments individually and/or in combination engage with at least one of the hollow fibers, thereby placing the hollow fibers extending substantially in-parallel into an inseparable bundle by means of the filaments while leaving spacings between the hollow fibers. The spacings are, in general, extremely narrow and uniform. When the filaments in combination engage with the hollow fibers, filaments may intertwine with one another. The bundle of the present invention may contain free filaments which do not engage with hollow fibers. Such free filaments may extend individually in separated form and/or extend in a fashion such that the filaments are intertwined with one another.

From the viewpoint of the bundle-forming and spacing-providing functions of the filament, the fineness of the filament and the ratio of the number of filaments to hollow fibers are critical features. The fineness of each filament is in the range of from 0.05 to 20 denier, preferably from 0.5 to 10 denier, more preferably from 1 to 5 denier. From the viewpoint of improving the binding of hollow fibers, the use of a filament having as small a fineness as possible is preferred because such a filament ensures effective intermingling and engaging with hollow fibers and intertwining between filaments. However, when the filament fineness is smaller than 0.05 denier, not only is the workability extremely poor but the uniform spread on the hollow fibers is also difficult, and further, appropriate spacings cannot be left between the hollow fibers.

On the other hand, when the filament fineness is larger than 20 denier, the packing ratio of hollow fibers in the bundle is too low and the effective surface area of the hollow fibers is too small. These are disadvantageous from the viewpoint of rendering a bundle for use in a fluid separator compact while attaining a high separation efficiency. Further, when the filament fineness is larger than 20 denier, the rigidity of the filament disadvantageously becomes too strong to effect desired intermingling and engaging between the filaments and the hollow fibers, and intertwining between the filaments.

The ratio of the number of filaments to hollow fibers is generally in the range of from 2 to 3000, preferably from 2 to 500, more preferably from 3 to 100. When the ratio is less than 2, sufficient, uniform spacings cannot be formed between hollow fibers, so that the flow of a fluid through the spacings is caused to be so irregular that separation efficiency is extremely poor. Further, when the ratio is less than 2, the binding of hollow fibers by the filaments is not satisfactory.

An appropriate ratio of the number of filaments to hollow fibers is selected within the range of from 2 to 3000, taking the filament fineness into consideration. In particular, the smaller the filament fineness, the higher the ratio of the number of filaments to hollow fibers. However, the ratio should not exceed 3000. When the ratio exceeds 3000, the packing ratio of hollow fibers in the bundle is too low and the effective surface area of permselective hollow fibers is too small. These are disadvantageous from the viewpoint of obtaining a fluid separator having a small fineness but capable of exhibiting a high separation efficiency.

When the filament having the above-defined fineness is used in the above-defined ratio, appropriate intermingling and engaging is attained between the filaments and the hollow fibers at least at a portion of each hollow fiber so that an inseparable bundle is formed.

The material of the filament is not critical, and may be selected from a wide variety of classes, such as a polyester, a polyamide, polyacrylonitrile, polypropylene, polyvinyl chloride, polyvinylidene fluoride, cellulose and a cellulose ester, taking into consideration the field and manner of use of the bundle. In particular, when the bundle is exposed to a corrosive fluid, a polyvinylidene fluoride is preferably used. When the bundle is used in hemodialysis, a polyester and a cellulose ester are preferably used due to the less contamination of blood.

As long as the filament has the above-defined fineness, the morphology of the filament is not limited. However, a monofilament which is longitudinally uniform in shape in cross-section is generally preferred from the viewpoint of the packing ratio of hollow fibers in the bundle and the facility and cost in the manufacturing of the bundle. When the ratio of the number of filaments to hollow fibers is low, it is preferred that the filaments have a non-circular cross-section, rather than a circular cross-section, because the former improves the intermingling and engaging between filaments and hollow fibers, and the intertwining between the filaments.

In the present invention, a plurality of filaments intermingle with a plurality of permselective, porous hollow fibers substantially lengthwise over the length of the hollow fibers extending substantially in-parallel. In this connection, it is to be noted that all of the individual filaments are not necessarily arranged lengthwise over the length of the hollow fibers, and that a part of the individual filaments may be waved in sections thereof or may slantingly extend over several hollow fibers. A part of the filaments intertwine with one another, and other parts of the filaments intermingle with and engage with one or a plurality of hollow fibers in a fashion such that the filaments lie over the outer wall surface of the hollow fibers. The intermingling and engaging between filaments and hollow fibers and the intertwining between filaments are, as a whole, effective for placing the hollow fibers extending substantially in parallel into an inseparable dense bundle while leaving spacings between the hollow fibers.

The method for preparing the bundle comprising a plurality of porous hollow fibers and a plurality of filaments according to the present invention is not particularly limited. For example, the bundle can be prepared by simply reeling around a hank a hollow fiber together with a plurality of individual filaments each having a fineness of from 0.05 to 20 denier until a bundle having a predetermined diameter is formed around the hank, in a manner such that the filaments intermingle with the hollow fibers substantially lengthwise over the length of the hollow fibers and that substantially all of the filaments each engage with at least one of the hollow fibers while leaving spacings between the hollow fibers. Alternatively, the bundle can be prepared by reeling on a hank one or several hollow fibers together with a multifilament composed of a plurality of individual filaments each having a fineness of from 0.05 to 20 denier while applying a turbulent air flow or a water stream for disjoining the multifilament until a bundle having a predetermined diameter is formed around the hank, in a manner such that the filaments intermingle with the hollow fibers substantially lengthwise over the length of the hollow fibers and that substantially all of the filaments each engage with at least one of the hollow fibers while leaving spacings between the hollow fibers. In this latter method, to improve the intermingling and engaging between filaments and hollow fibers, the bundle formed around the hank may be taken out and cut to obtain a longitudinal bundle, to which a water stream or a turbulent air flow is applied, optionally under vibration, while fixing one end of the longitudinal bundle and allowing the other end of the longitudinal bundle to be free. When the multifilament is used, one not textured is preferred from the viewpoint of the desired entangling of filaments with hollow fibers.

In the present invention, it is preferred that each filament has a circular cross-section having a diameter which is in the range of from one-tenth to one-hundredth the outer diameter of the cross-section of the hollow fibers. In this case, because the diameter of the filament is extremely small as compared to that of the hollow fiber, a bundle having a high packing ratio of hollow fibers can be obtained.

Conventionally, hollow fibers are bundled by constraint means, such as a band and a wrapping paper, prior to the incorporation into a fluid separator casing, because without such constraint means, hollow fibers are disjoined. By contrast, in the present invention, the hollow fibers are formed into an inseparable bundle by means of the filaments while leaving narrow but uniform spacings between the hollow fibers. The bundle of the present invention is inseparable unless an external separating force is applied, and thus it is easy to handle. Therefore, when the bundle of the present invention is used, in the preparation of a fluid separator, it is not necessary to employ the above-mentioned band or wrapping paper, because the bundle is free from the separation of the individual hollow fibers from the periphery of the bundle and breaking and damaging of the hollow fibers during handling. Accordingly, incorporation of the bundle of the present invention in a fluid separator casing can be performed very easily, because the steps of applying a band or a wrapping paper to the hollow fibers prior to incorporation in a casing and removing the same thereafter are avoided.

In another aspect of the present invention, there is provided a fluid separator comprising:
 a casing provided with a fluid inlet and a fluid outlet, and
 a bundle of permselective hollow fibers comprising:
 a plurality of porous hollow fibers extending substantially in-parallel, and
 a plurality of filaments which intermingle with the hollow fibers substantially lengthwise over the length of the hollow fibers, each filament having a fineness of from 0.05 to 20 denier, the ratio of the number of the filament hollow fibers being from 2 to 3000, substantially all of the filaments each engaging with at least one of the hollow fibers, thereby placing the hollow fibers extending substantially in-parallel into an inseparable bundle by means of the filaments while leaving spacings between the hollow fibers, the bundle of permselective hollow fibers being disposed in the casing along the length of the casing, each hollow fiber having openings at both ends thereof, the hollow fibers and the filaments being bonded together at both end portions thereof while leaving the openings of the hollow fibers unblocked, and fluid-tightly fixed at the bonded both end portions to the inner wall of the casing, thereby establishing isolation of the openings of the hollow fibers from the spacings between the hollow fibers, the openings of each hollow fiber at one end thereof and at the other end thereof being communicated with the fluid inlet and the fluid outlet, respectively, the casing having a first port and a second port which are communicated with the spacings between the hollow fibers.

Figure 3:
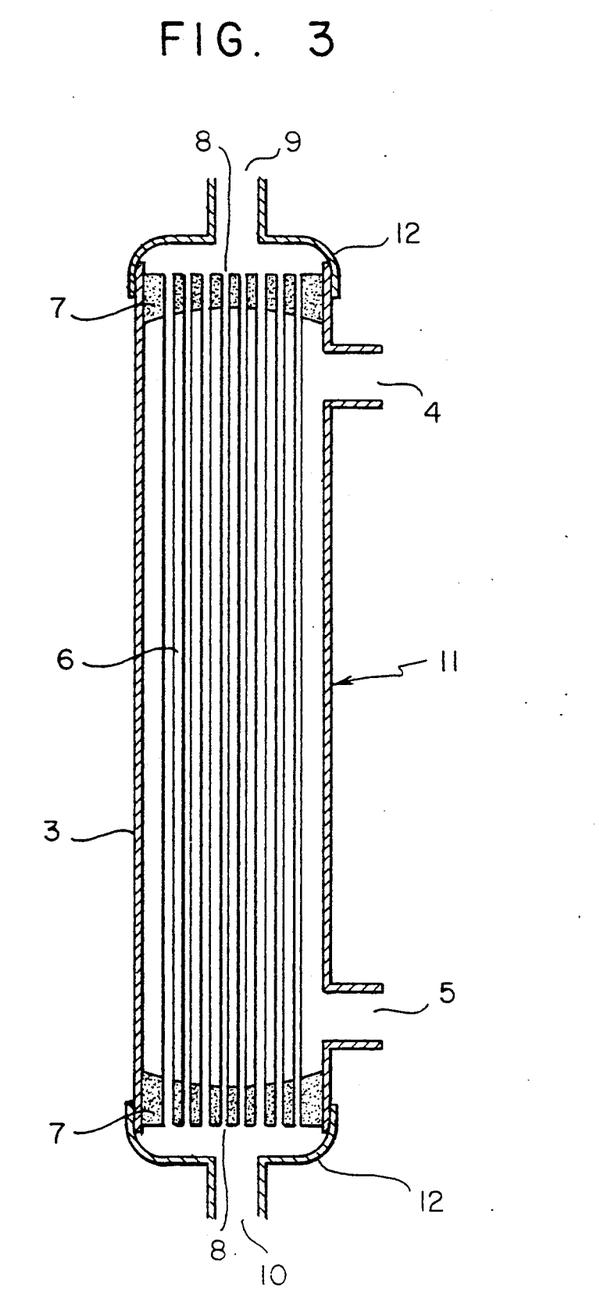
FIG. 3 shows a diagrammatic, longitudinal cross-section of one form of the fluid separator according to the present invention, in which the bundle of permselective hollow fibers of the present invention is incorporated.

FIG. 3 shows a diagrammatic, longitudinal cross-section of one form of the fluid separator according to the present invention. As shown in FIG. 3, a bundle of permselective hollow fibers 6 according to the present invention is incorporated in a cylindrical casing composed of header 12 and barrel 3 and provided with fluid inlet 9 and fluid outlet 10 together with a first port 4 and a second port 5. The casing is not limited to that of a cylindrical shape but can assume any other shape as long as the purpose of the separator is not adversely influenced. The bundle is disposed in casing barrel 3 along the length of casing barrel 3, and hollow fibers 6 and filaments (not shown) having substantially the same length as that of hollow fibers 6 are bonded together at both end portions thereof while leaving the openings of the hollow fibers unblocked, and fluid-tightly fixed at the both bonded end portions to the inner wall of casing barrel 3 with adhesive (potting or embedding agent) 7, thereby establishing isolation of the openings (and interiors) of the hollow fibers from the spacings between the hollow fibers. Each hollow fiber 6 has openings 8 at both ends thereof, and openings 8 of each hollow fiber 6 at one end thereof and at the other end thereof are communicated with fluid inlet 9 and fluid outlet 10, respectively. First port 4 and second port 5 are communicated with the spacings between hollow fibers 6.

The above-mentioned casing composed of header 12 and barrel 3 and provided with fluid inlet 9 and fluid outlet 10 together with first port 4 and second port 5 is not particularly limited, and conventional casings can be used in the present invention, for which reference is made to for example, Japanese Patent No. 1,402,498. Further, the above-mentioned adhesive (potting agent or embedding agent) 7 is not critical, and conventional adhesives can be used in the present invention, for which reference is made to for example, U.S. Pat. No. 3,962,094.

When only hollow fibers are bundled, without the use of filaments, at a packing ratio of hollow fibers in the separator which is as high as for example, 68%, excessively dense areas of hollow fibers are formed in the casing at both of the end portions of the hollow fibers bonded together and fixed to the casing. In such excessively dense areas of hollow fibers, the spacings of the hollow fibers are too narrow for an adhesive having a high viscosity to permeate thereinto. This brings about defective fluid separators. To cope with this problem, usually, the stiffness of the above-mentioned end portions of the bundle of the hollow fibers are taken off by kneading and rubbing prior to the incorporation of the hollow fibers in the casing. However, this kneading and rubbing is likely to cause the end portions of the bundle of the hollow fibers to become so bulky that the bundle can no longer be incorporated in the casing, or that the assembly yield of fluid separators is lowered due to forced squeezing at the end portions which damages hollow fibers. By contrast, when the bundle of the present invention is incorporated in and fixed to the separator casing, narrow but uniform spacings are formed between the hollow fibers due to the presence of filaments, irrespective of packing ratios of hollow fibers in the separator casing. These spacings ensure desirable permeation of an adhesive (potting agent or embedding agent) without the necessity of the above-mentioned kneading and rubbing for taking off the stiffness of the end portion of the bundle of the hollow fibers even at a packing ratio of hollow fibers in the separator which is as high as for example, 68%, thereby avoiding the generation of defective hollow fibers due to poor adhesion.

A fluid, for example, blood to be dialyzed, is introduced into fluid separator 11 of the present invention through fluid inlet 9. This fluid flows through hollow fibers 6 and comes out of fluid separator 11 through fluid outlet 10. Another fluid, for example, a dialyzate, is introduced into fluid separator 11 through first port 4. This fluid flows through the spacings between hollow fibers 6 and comes out of fluid separator 11 through second port 5. The transfer of a component or components occurs between the fluids through the wall of hollow fibers 6. The flowabilities of the fluids are excellent, so that a high separation efficiency can be attained by the use of the fluid separator of the present invention. Incidentally, the severance of a small amount of filaments into pieces in the separator does not affect the performance of the fluid separator of the present invention.

As apparent from the foregoing, according to the present invention, an inseparable bundle of permselective hollow fibers having a high packing ratio of hollow fibers in the bundle is provided, which is prepared using filaments having a fineness as small as 0.05 to 20 denier. From the bundle of the present invention, a fluid separator having a high packing ratio of hollow fibers in the separator is efficiently prepared, which has a small fineness but exhibits a high performance. For example, according to the conventional techniques, it is not feasible to provide a fluid separator having a packing ratio of hollow fibers in the separator (as defined later) which is 60% or more at a desirable assembly yield (as defined later). However, according to the present invention, a fluid separator having a packing ratio of hollow fibers in the separator which is as high as for example, 68% can be provided at an assembly yield as high as 95% or above.

In the bundle of the present invention, narrow but uniform spacings are formed between the hollow fibers by filaments of small fineness, so that a fluid can uniformly flow through the spacings, and that the outer surface of the hollow fibers of the bundle can be effectively used for fluid separation. For example, when the fluid separator of the present invention is used as a hemodialyzer, the dialysis efficiency in terms of urea clearance (as defined later) is as excellent as about 100%.

DETAILED DESCRIPTION OF THE PREFERRED EMBODIMENTS

This invention will now be described in greater detail with reference to the following Examples and Comparative Examples, which should not be construed to be limiting the scope of the present invention.

In the following Examples and Comparative Examples, a hemodialyzer is assembled as an example of a fluid separator, and the separation efficiency of the hemodialyzer is evaluated in terms of dialysis efficiency of urea. The properties and characteristics with respect to the bundle of hollow fibers and the hemodialyzer are determined according to the following methods.

1. Packing Ratio of Hollow Fibers in Hemodialyzer

The packing ratio ($p$) of hollow fibers in a hemodialyzer is defined by the formula:

$$p = N \cdot m / M$$

wherein,
M represents the cross-section area of the hemodialyzer casing which is defined by the inner wall thereof;
m represents the cross-section area of each hollow fiber being in the wet state which is defined by the periphery thereof; and
N represents the number of hollow fibers.

2. Assembly Yield

The assembly yield is defined as a percentage of successful dialyzer assemblies to tried dialyzer assemblies.

3. Effective Surface Area

The effective surface area (S) of a hemodialyzer is calculated by the formula:

$$S = n \times L \times 2\pi r$$

wherein,
n represents the number of hollow fibers incorporated in the hemodialyzer; and
L and r represent the effective length (i.e. length of a portion exposed without being covered by adhesive), and the half of the inside diameter, respectively, of each of the hollow fibers incorporated in the hemodialyzer.

4. Measuring of Urea Clearance

Referring to FIG. 3, an aqueous solution containing urea in a concentration of 1 g/liter is introduced into hemodialyzer 11 through fluid inlet 9. This solution flows through hollow fibers 6 at a rate of 200 ml/min and comes out of hemodialyzer 11 through fluid outlet 10. On the other hand, water is introduced into hemodialyzer 11 through first port 4. The water flows through the spacings between hollow fibers 6 at a rate of 500 ml/min and comes out of hemodialyzer 11 through second port 5. The urea concentration ($C_{Bi}$) in the aqueous solution before being introduced into the hemodialyzer and the urea concentration ($C_{Bo}$) in the aqueous solution flowing out of the hemodialyzer are measured by the conventional method in which color development is effected and color intensity is measured with a spectrophotometer. The Urea Clearance ($C_L$) is calculated by the formula:

$$C_L = \frac{C_{Bi} - C_{Bo}}{C_{Bi}} \times 200 \text{ ml/min}.$$

5. Theoretical Urea Clearance

The theoretical urea clearance ($C_L'$) is calculated by the formula:

$$C_L' = \frac{1 - \exp[N_T(1-Z)]}{Z - \exp[N_T(1-Z)]} \cdot Q_B$$

wherein
$Q_B$ represents the flow rate of the urea solution,
$Q_D$ represents the flow of the water dialyzate,
Z represents the flow rate ratio defined by $Z = Q_B/Q_D$,
$N_T$ represents the transfer unit number defined by $N_T = KA/Q_B$,
K represents the overall mass transfer coefficient, and
A represents the effective surface area of hollow fibers of the hemodialyzer.

6. Dialysis Efficiency

The dialysis efficiency represents the percentage of measured clearance to theoretical clearance.

EXAMPLE 1

Two polyacrylonitrile hollow fibers having an inner diameter of 250 μm and an outer diameter of 320 μm are reeled together with a polyester multifilament composed of 24 monofilaments each having a fineness of 2.1 denier 3450 times around a hank having a peripheral length of about 2 m, while applying a water stream for disjoining the multifilament. The bundle formed around the hank is taken out and cut to obtain a longitudinal bundle comprised of 6900 polyacrylonitrile hollow fibers and 6900×12 polyester monofilaments, which has a length of about 2 m. Subsequently, a water stream is applied to the longitudinal bundle which is fixed at one end but free at the other end in a manner such that the filaments are intermingled with the hollow fibers substantially lengthwise over the length of the hollow fibers and that substantially all of the filaments each engage with at least one of the hollow fibers, thereby placing the hollow fibers extending substantially in-parallel into a final bundle by means of the filaments. The bundle of permselective hollow fibers produced by the above-described method contains 6,900 hollow fibers, and the ratio of the number of filaments to hollow fibers in 12.

EXAMPLE 2

The final bundle of permselective hollow fibers produced in Example 1 is incorporated into a cylindrical casing of 31.6 mm in inner diameter and 210 mm in length and fixed to the inner wall of the casing to obtain a hemodialyzer as shown in FIG. 3. The packing ratio of hollow fibers in the hemodialyzer is 68.5%, and the effective surface are of the hemodialyzer is 1.0 m².

The assembly yield for 100 hemodialyzers as obtained above is 98%. The urea clearance, the urea permeation coefficient, the theoretical urea clearance and the dialysis efficiency of the hemodialyzer are 191 ml/min, $15.2 \times 10^{-4}$ cm/sec, 192 ml/min and 99%, respectively.

EXAMPLE 3

Two polyacrylonitrile hollow fibers having an inner diameter of 250 μm and an outer diameter of 320 μm are reeled together with a polyester multifilament composed of 1120 monofilaments each having a fineness of 0.1 denier 4150 times around a hank having a peripheral length of about 2 m, while applying a water stream for disjoining the multifilament. The bundle formed around the hank is taken out and cut to obtain a longitudinal bundle comprised of 8300 polyacrylonitrile hollow fibers and 8300×560 polyester monofilaments, which has a length of about 2 m. Subsequently, (1) first, a water stream is applied to the longitudinal bundle which is fixed at one end but free at the other end, (2) second, the bundle is cut into short bundles of 310 mm in length and a water stream is applied to the short bundle which is caused to stand straight and fixed at an upper end, while swinging the upper end, and (3) third, the short bundle is turned upside down and the same operation as in (2) is repeated, so as to cause the filaments to intermingle with the hollow fibers substantially lengthwise over the length of the hollow fibers and to cause substantially all of the filaments to each engage with at least one of the hollow fibers, thereby placing the hollow fibers extending substantially in-parallel into a final bundle by means of the filaments. The bundle of permselective hollow fibers produced by the above-described method contains 8300 hollow fibers, and the ratio of the number of filaments to hollow fibers is 560.

EXAMPLES 4–12

Bundles of permselective hollow fibers are produced in substantially the same manner as described in Example 1, except that the material and the fineness of the filament and the filament-to-fiber ratio of the bundle are varied as shown in Table 1. Each of the produced bundles is incorporated into a casing of 34.7 mm in inner diameter and 251 mm in length to obtain a hemodialyzer. The number of hollow fibers, the packing ratio of hollow fibers and the effective surface area of hollow fibers in the hemodialyzer are 8,300, 68% and 1.5 m$^2$, respectively. Using each of the hemodialyzers, dialysis is carried out in the same method as described in Example 2. The results of clearance and dialysis efficiency are shown in Table 1.

COMPARATIVE EXAMPLE 1

Using a wrapping paper in place of filaments, a bundle of hollow fibers is produced in substantially the same manner as described in Example 1. A hemodialyzer having the bundle incorporated therein is produced in substantially the same manner as described in Example 2. The assembly yield for 10 hemodialyzers is 0%. All of the hemodialyzers have the same defection due to pinhole formation (causing leakage at the time of dialysis) caused by poor permeation of a curable adhesive (potting agent) into the spacings between the hollow fibers at the end portions thereof.

COMPARATIVE EXAMPLE 2

Using a wrapping paper in place of filaments, a bundle of hollow fibers is produced in substantially the same manner as described in Example 1. A hemodialyzer having the bundle incorporated into a casing of 40 mm in inner diameter and 240 mm in length is produced in substantially the same manner as described in Example 2. The number of hollow fibers, the packing ratio of hollow fibers and the effective surface area of hollow fibers in the hemodialyzer are 9400, 60% and 1.6 m$^2$, respectively. Using the hemodialyzer, dialysis is carried out in the same method as described in Example 2. The results of clearance and dialysis efficiency are shown in Table 1.

COMPARATIVE EXAMPLE 3

On the same polyacrylonitrile hollow fiber as used in Example 1, a 75-denier 36-filament polyester textured yarn is spirally wound at a winding number of 1 per 10 mm of the hollow fiber in two layers in substantially the same manner as described in Example 1 of U.S. Pat. No. 4,293,418 to thereby obtain a hollow fiber element. Using the hollow fiber element, a hemodialyzer is assembled in substantially the same manner as in Example 2 of the present invention, except that no filament is used. The assembly yield for 10 hemodialyzers as obtained above is 0%. All of the hemodialyzers have the same defect due to damages of hollow fibers during the incorporation of hollow fibers into the casing, which damages are caused by the bulkiness of the bundle of hollow fibers.

COMPARATIVE EXAMPLE 4

In substantially the same manner as described in Comparative Example 3, a hollow fiber element is produced, and a hemodialyzer having an effective surface area of hollow fibers of 1.5 m$^2$ (same as in Examples 4–12) 7800 hollow fibers incorporated in a casing of 41.3 mm in inner diameter and 266 mm in length of a packing ratio of hollow fibers of 45%. Using the hemodialyzer, dialysis is carried out in the same method as described in Example 2. The results of clearance and dialysis efficiency are shown in Table 1.

EXAMPLE 13

The same polyacrylonitrile hollow fiber as used in Example 1 is reeled together with a polyester multifilament composed of 96 monofilaments each having a fineness of 2.1 denier 6200 times around a hank in substantially the same manner as described in Example 1 to produce a bundle. The produced bundle is incorporated in a casing of 36.9 mm in inner diameter and 276 mm in length and assembled into a hemodialyzer. The ratio of the number of filaments to hollow fibers is 96. The number of hollow fibers, the packing ratio of hollow fibers and the effective surface area of hollow fibers in the hemodialyzer are 6200, 45% and 1.3 m$^2$, respectively. Using the hemodialyzer, dialysis is carried out in the same method as described in Example 2. The results of clearance and dialysis efficiency are shown in Table 1.

COMPARATIVE EXAMPLE 5

On a pair of polyacrylonitrile hollow fibers as used in Example 1, a 15 denier 6-filament (each filament having a fineness of 2.5 denier) polyester textured yarn is spirally wound at a winding number of 0.5 per 10 mm of the hollow fiber in one layer in substantially the same manner as described in Example 3 of U.S. Pat. No. 4,293,418 to thereby obtain a hollow fiber element. Such hollow fiber elements are assembled into a hemodialyzer in substantially the same manner as described in Examples 4–12 of the present invention, except that no filament is used. Using the hemodialyzer, dialysis is carried out in the same method as described in Example 2. The results of clearance and dialysis efficiency are shown in Table 1.

EXAMPLE 14

Four polyacrylonitrile hollow fibers as used in Example 1 are reeled together with a polyester multifilament composed of 12 monofilaments each having a fineness of 15 denier 1825 times around a hank in substantially the same manner as described in Example 1. The resultant bundle is incorporated in a casing of 34.7 mm in inner diameter and 251 mm in length and assembled into a hemodialyzer. The ratio of the number of filaments to hollow fibers is 3. The number of hollow fibers, the packing ratio of hollow fibers and the effective surface area of hollow fibers in the hemodialyzer are 7300, 60% and 1.3 m$^2$, respectively. Using the hemodialyzer, dialysis is carried out in the same method as described in Example 2. The results of clearance and dialysis efficiency are shown in Table 1.

COMPARATIVE EXAMPLE 6

A hemodialyzer is produced in substantially the same manner as described in Example 14, except that 24 hollow fibers are reeled together with a polyester multifilament composed of 12 monofilaments each having a fineness of 15 denier, that is, the ratio of the number of filaments to hollow fibers being 0.5. Using the hemodialyzer, dialysis is carried out in the same method as described in Example 2. The results of clearance and dialysis efficiency are shown in Table 1.

COMPARATIVE EXAMPLE 7

A hollow fiber bundle as described in U.S. Pat. No. 4,950,391 is produced by reeling 25 polyacrylonitrile hollow fibers as employed in Example 1 of the present invention together with a polyester textured yarn composed of 36 filaments each having a fineness of 15 denier. The produced bundle is incorporated in a casing of 40 mm in inner diameter and 240 mm in length and assembled into a hemodialyzer. The ratio of the number of textured yarns to hollow fibers is 0.04. The number of hollow fibers, the packing ratio of hollow fibers and the effective surface area of hollow fibers in the hemodialyzer are 8800, 56% and 1.5 m$^2$, respectively. The properties of the hemodialyzer are shown in Table 1.

EXAMPLE 15

Four cuprammonium regenerated cellulose hollow fibers having an inner diameter of 185 μm and an outer diameter of 220 μm are reeled together with a polyester multifilament composed of 32 monofilaments each having a fineness of 1.6 denier 3000 times around a hank having a peripheral length of about 2 m, while applying a turbulent air flow for disjoining the multifilament. By the application of the air, the filaments are intermingled with the hollow fibers substantially lengthwise over the length of the hollow fibers and substantially all of the filaments each engage with at least one of the hollow fibers, thereby placing the hollow fibers extending substantially in-parallel into an inseparable bundle by means of the filaments. The number of hollow fibers is 12000 and the ratio of the number of filaments to hollow fibers is 8.

The produced bundle is incorporated in a casing of 36.5 mm in inner diameter and 276 mm in length, and assembled into a hemodialyzer. The packing ratio of hollow fibers and the effective surface area of hollow fibers in the hemodialyzer are 67% and 1.8 m$^2$, respectively. Using the hemodialyzer, dialysis is carried out in the same method as described in Example 2. The urea clearance, the urea permeation coefficient, the theoretical urea clearance and the dialysis efficiency of the hemodialyzer are 194 ml/min, 12×10$^{-4}$ cm/sec, 198 ml/min and 98%, respectively.

EXAMPLES 16–20

Bundles of permselective hollow fibers are produced in substantially the same manner as described in Example 15, except that the material and the fineness of the filament and the filament-to-fiber ratio of the bundle are varied as shown in Table 2. Each of the produced bundles is incorporated in a casing having the fineness described in Table 1 and assembled into a hemodialyzer.

The number of hollow fibers, the packing ratio of hollow fibers and the effective surface area of hollow fibers in the hemodialyzers are shown in Table 2. Using each of the hemodialyzers, dialysis is carried out in the same method as described in Example 15. The results of clearance and dialysis efficiency are shown in Table 2.

COMPARATIVE EXAMPLE 8

A bundle of cuprammonium regenerated cellulose hollow fibers is prepared with the omission of the use of filaments. That is, cuprammonium regenerated cellulose hollow fibers as employed in Example 15 are bundled using a wrapping paper according to the conventional procedure. The produced bundle is incorporated in a casing and assembled into a hemodialyzer in the same manner as described in Example 15. Using the hemodialyzer, dialysis is carried out in the same method as described in Example 15. The results of clearance and dialysis efficiency are shown in Table 2.

COMPARATIVE EXAMPLE 9

Four cuprammonium regenerated cellulose hollow fibers as used in Example 15 are reeled together with Bemberg (registered trade mark) multifilament composed of 44 monofilaments each having a fineness of 1.7 denier 2575 times around a hank having a peripheral length of about 2 m, without no air blow applied to produce a bundle. The number of hollow fibers is 10300 and the ratio of the number of filaments to hollow fibers is 1.

The produced bundle is incorporated in a casing of 36.5 mm in inner diameter and 276 mm in length and assembled into a hemodialyzer. Using the hemodialyzer, dialysis is carried out in the same method as described in Example 15. The results of clearance and dialysis efficiency are shown in Table 2. Separation of filaments from hollow fibers is found by an observation of both ends of the bundle.

TABLE 1

| | Hollow Fiber | | | | Filament | | | Casing | | |
|---|---|---|---|---|---|---|---|---|---|---|
| | Material | Inner Diameter (μm) | Outer Diameter (μm) | Number | Material | Size (denier) | Filament -to-Fiber Ratio | Inner Diameter (mm) | Length (mm) | Packing Ratio (%) |
| Example 1 | Polyacrylo-nitrile | 250 | 320 | 6,900 | Polyester | 2.1 | 12 | — | — | — |

TABLE 1-continued

| | | | | | | | | | | |
|---|---|---|---|---|---|---|---|---|---|---|
| Example 2 | Polyacrylonitrile | 250 | 320 | 6,900 | Polyester | 2.1 | 12 | 31.6 | 210 | 68.5 |
| Example 3 | Polyacrylonitrile | 250 | 320 | 8,300 | Polyester | 0.1 | 560 | — | — | — |
| Example 4 | Polyacrylonitrile | 250 | 320 | 8,300 | Polyester | 2.1 | 48 | 34.7 | 251 | 68 |
| Example 5 | Polyacrylonitrile | 250 | 320 | 8,300 | Polyester | 2.5 | 3 | 34.7 | 251 | 68 |
| Example 6 | Polyacrylonitrile | 250 | 320 | 8,300 | Polyester | 4.2 | 3 | 34.7 | 251 | 68 |
| Example 7 | Polyacrylonitrile | 250 | 320 | 8,300 | Polyester | 2.1 | 18 | 34.7 | 251 | 68 |
| Example 8 | Polyacrylonitrile | 250 | 320 | 8,300 | Polyester | 0.1 | 560 | 34.7 | 251 | 68 |
| Example 9 | Polyacrylonitrile | 250 | 320 | 8,300 | Polyester | 15 | 6 | 34.7 | 251 | 68 |
| Example 10 | Polyacrylonitrile | 250 | 320 | 8,300 | Polyester | 0.1 | 2,800 | 34.7 | 251 | 68 |
| Example 11 | Polyacrylonitrile | 250 | 320 | 8,300 | Polyester | 0.1 | 93 | 34.7 | 251 | 68 |
| Example 12 | Polyacrylonitrile | 250 | 320 | 8,300 | Polyester | 0.1 | 448 | 34.7 | 251 | 68 |
| Comparative Example 1 | Polyacrylonitrile | 250 | 320 | 6,900 | — | — | — | 31.6 | 210 | (68.5) |
| Comparative Example 2 | Polyacrylonitrile | 250 | 320 | 9,400 | — | — | — | 40 | 240 | 60 |
| Comparative Example 3 | Polyacrylonitrile | 250 | 320 | 6,900 | Polyester | (75) | (1) | 31.6 | 210 | — |
| Comparative Example 4 | Polyacrylonitrile | 250 | 320 | 7,800 | Polyester | (75) | (1) | 41.3 | 266 | 45 |
| Example 13 | Polyacrylonitrile | 250 | 320 | 6,200 | Polyester | 2.1 | 96 | 36.9 | 276 | 45 |
| Comparative Example 5 | Polyacrylonitrile | 250 | 320 | 8,300 | Polyester | (15) | (0.5) | 34.7 | 251 | 68 |
| Example 14 | Polyacrylonitrile | 250 | 320 | 7,300 | Polyester | 15 | 3 | 34.7 | 251 | 60 |
| Comparative Example 6 | Polyacrylonitrile | 250 | 320 | 7,300 | Polyester | 15 | 0.5 | 34.7 | 251 | 60 |
| Comparative Example 7 | Polyacrylonitrile | 250 | 320 | 8,800 | Polyester | (15) | 0.04 | 40 | 240 | 56 |

| | Effective Surface Area ($m^2$) | Clearance Measured (ml/min) | Clearance Theoretical (ml/min) | Dialysis Efficiency (%) | Remark |
|---|---|---|---|---|---|
| Example 1 | — | — | — | — | Assembly Yield* for 100 dialyzers: 98% |
| Example 2 | 1.0 | 191 | 192 | 99 | |
| Example 3 | — | — | — | — | |
| Example 4 | 1.5 | 197 | 198 | 99 | |
| Example 5 | 1.5 | 197 | 198 | 99 | |
| Example 6 | 1.5 | 199 | 198 | 101 | |
| Example 7 | 1.5 | 196 | 198 | 99 | |
| Example 8 | 1.5 | 194 | 198 | 98 | |
| Example 9 | 1.5 | 193 | 198 | 97 | |
| Example 10 | 1.5 | 192 | 198 | 97 | |
| Example 11 | 1.5 | 196 | 198 | 99 | |
| Example 12 | 1.5 | 196 | 198 | 99 | |
| Comparative Example 1 | (1.0) | — | — | — | No filament used |
| Comparative Example 2 | 1.6 | 182 | 198 | 92 | No filament used |
| Comparative Example 3 | — | — | — | — | Spirally wound filament Assembly Yield for 10 dialyzers: 0% |
| Comparative Example 4 | 1.5 | 185 | 198 | 93 | Spirally wound filament |
| Example 13 | 1.3 | 191 | 197 | 97 | |
| Comparative Example 5 | 1.5 | 186 | 198 | 94 | Spirally wound filament |
| Example 14 | 1.3 | 193 | 197 | 98 | |
| Comparative Example 6 | 1.3 | 181 | 197 | 92 | Low Filament-to-Fiber Ratio |
| Comparative Example 7 | 1.5 | 179 | 198 | 90 | Textured yarn (outer diameter 320 μm) |

TABLE 2

| | Hollow Fiber | | | | Filament | | | Casing | | |
|---|---|---|---|---|---|---|---|---|---|---|
| | Material | Inner Diameter (μm) | Outer Diameter (μm) | Number | Material | Size (denier) | Filament-to-Fiber Ratio | Inner Diameter (mm) | Length (mm) | Packing Ratio (%) |
| Example 15 | Cuprammonium regenerated cellulose | 185 | 220 | 12,000 | Polyester | 1.6 | 8 | 36.5 | 276 | 67 |
| Example 16 | Cuprammonium regenerated cellulose | 185 | 220 | 11,000 | Polyester | 1.6 | 8 | 36.5 | 276 | 61 |
| Example 17 | Cuprammonium regenerated cellulose | 185 | 220 | 11,000 | Polyester | 2.5 | 3 | 36.5 | 276 | 61 |
| Example 18 | Cuprammonium regenerated cellulose | 185 | 220 | 11,000 | Bemberg | 1.7 | 11 | 36.5 | 276 | 61 |
| Example 19 | Cuprammonium regenerated cellulose | 185 | 220 | 7,500 | Polyester | 0.1 | 50 | 33.0 | 251 | 59 |
| Example 20 | Cuprammonium regenerated cellulose | 185 | 220 | 8,900 | Polyester | 2.5 | 2 | 29.6 | 210 | 69 |
| Comparative Example 8 | Cuprammonium regenerated cellulose | 185 | 220 | 12,000 | — | — | — | 36.5 | 276 | 67 |
| Comparative Example 9 | Cuprammonium regenerated cellulose | 185 | 220 | 10,300 | Bemberg | 1.7 | 11 | 36.5 | 276 | 57 |

| | Effective Surface Area (m$^2$) | Clearance Measured (ml/min) | Clearance Theoretical (ml/min) | Dialysis Efficiency (%) | Remark |
|---|---|---|---|---|---|
| Example 15 | 1.8 | 194 | 198 | 98 | |
| Example 16 | 1.7 | 193 | 197 | 98 | |
| Example 17 | 1.7 | 191 | 197 | 97 | |
| Example 18 | 1.7 | 187 | 197 | 95 | |
| Example 19 | 1.3 | 187 | 193 | 97 | |
| Example 20 | 1.0 | 182 | 186 | 98 | |
| Comparative Example 8 | 1.8 | 179 | 198 | 90 | No filament used |
| Comparative Example 9 | 1.6 | 156 | 196 | 80 | Assembled without turbulent air |

What is claimed is:

1. A bundle of permselective hollow fibers comprising:
   a plurality of porous hollow fibers extending substantially in-parallel; and
   a plurality of filaments which intermingle with said hollow fibers substantially lengthwise over the length of said hollow fibers, each filament having a fineness of from 0.05 to 20 denier;
   the ratio of the number of said filaments to said hollow fibers being from 2 to 3000;
   substantially all of said filaments each engaging with at least one of said hollow fibers, thereby placing said hollow fibers extending substantially in-parallel into an inseparable bundle by means of said filaments while leaving spacings between said hollow fibers.

2. The bundle according to claim 1, wherein each hollow fiber has an annular cross section having an outer diameter of from 100 to 1000 μm.

3. The bundle according to claim 1, wherein each filament has a fineness of from 0.5 to 10 denier.

4. The bundle according to claim 3, wherein each filament has a fineness of from 1 to 5 denier.

5. The bundle according to claim 2, wherein each filament has a circular cross section having a diameter which is in the range of from one-tenth to one-hundredth the outer diameter of the cross section of said hollow fibers.

6. The bundle according to claim 1, wherein the ratio of the number of said filaments to said hollow fibers is in the range of from 2 to 500.

7. The bundle according to claim 6, wherein the ratio is in the range of from 3 to 100.

8. A fluid separator comprising:
   a casing provided with a fluid inlet and a fluid outlet, and
   a bundle of permselective hollow fibers comprising:
   a plurality of porous hollow fibers extending substantially in-parallel, and a plurality of filaments which intermingle with said hollow fibers substantially lengthwise over the length of said hollow fibers, each filament having a fineness of from 0.05 to 20 denier, the ratio of the number of said filaments to said hollow fibers being from 2 to 3000, substantially all of said filaments each engaging with at least one of said hollow fibers, thereby placing said hollow fibers extending substantially in-parallel into an inseparable bundle by means of said filaments while leaving spacings between said hollow fibers, said bundle of permselective hollow fibers being disposed in the casing along the length of the casing, each hollow fiber having openings at both ends thereof, said hollow fibers and said filaments being bonded together at both end portions thereof while leaving said openings of the hollow fibers unblocked, and fluid-tightly fixed at the bonded both end portions to the inner wall of the casing, thereby establishing isolation of the openings of the hollow fibers from the spacings between the hollow fibers, said openings of each hollow fiber at one end thereof and at the other end thereof being communicated with said fluid inlet and said fluid outlet, respectively, said casing having a first port and a second port which are communicated with said spacings between said hollow fibers.

* * * * *